United States Patent Office 3,478,513
Patented Nov. 18, 1969

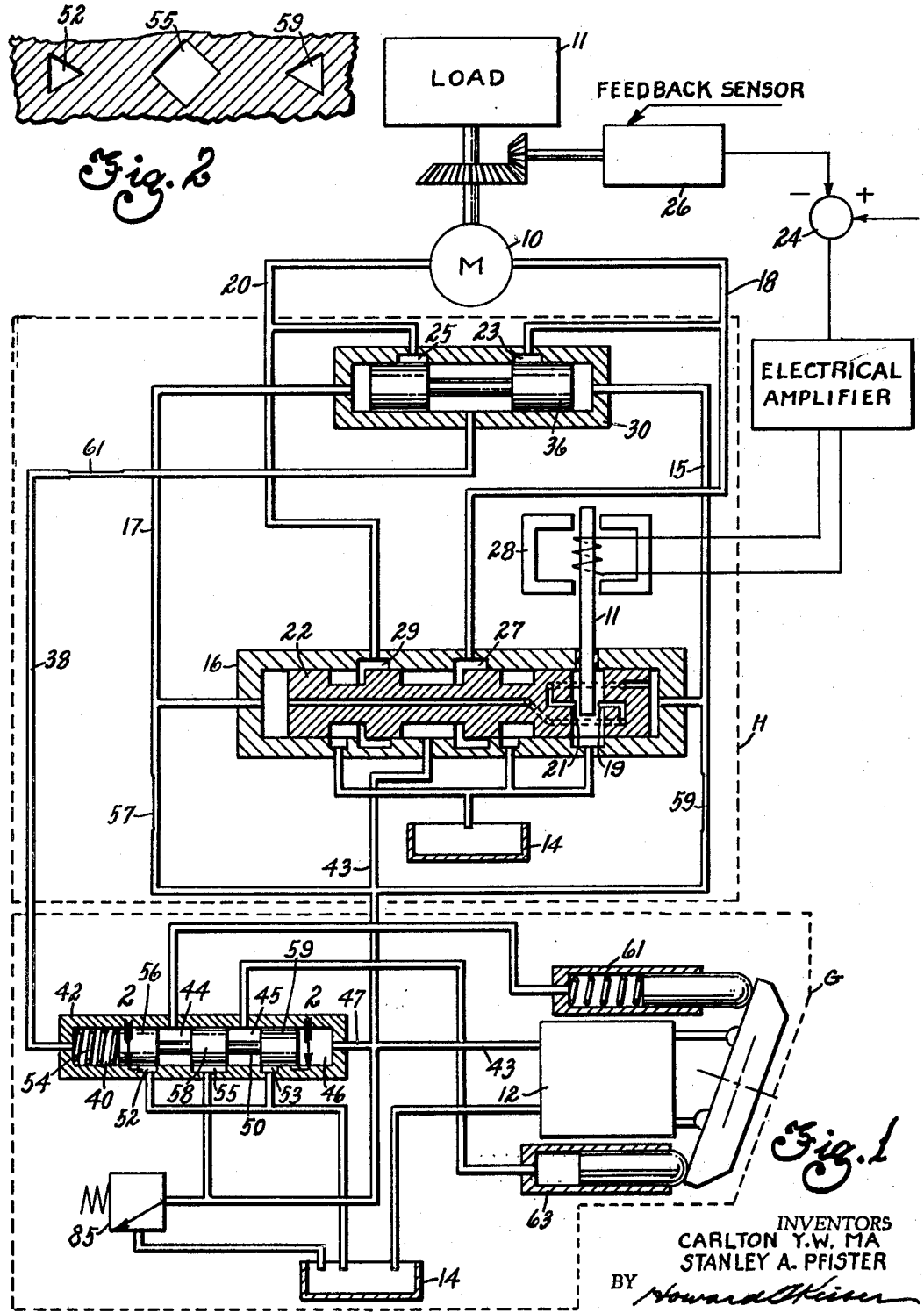

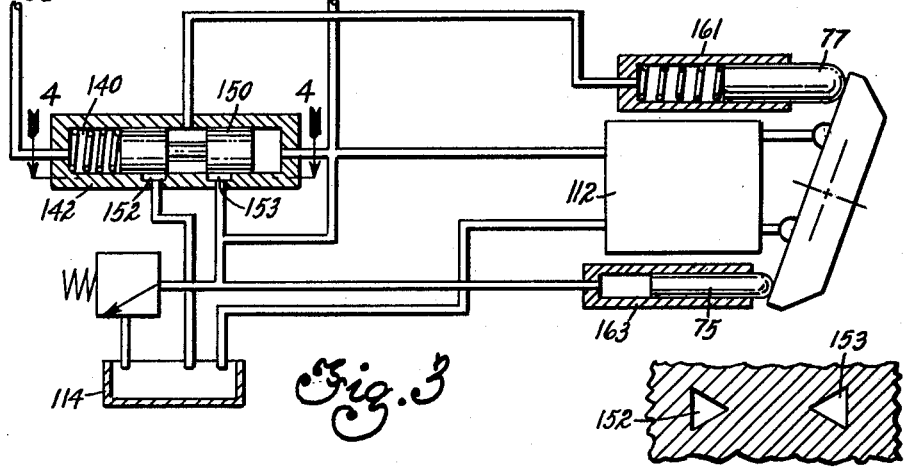
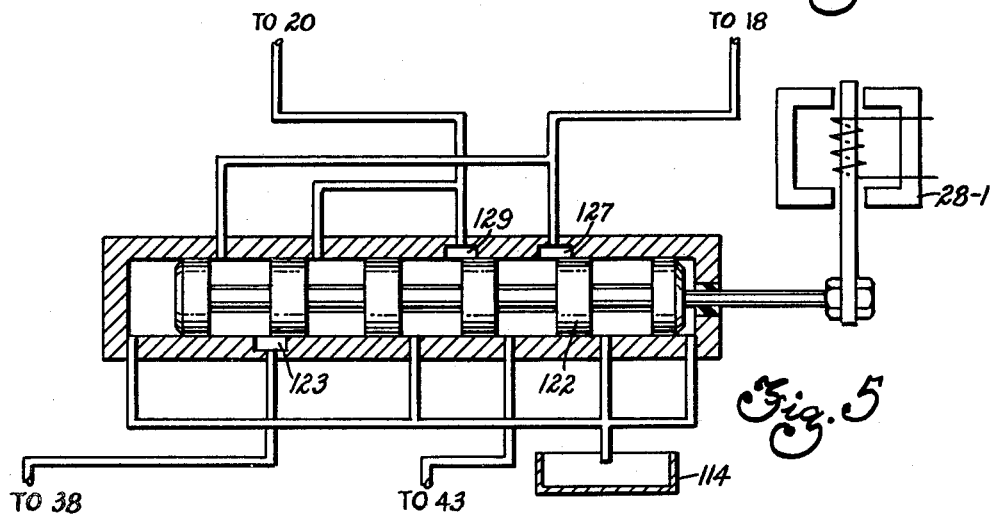
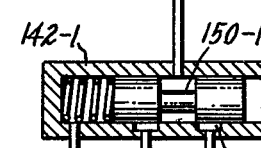

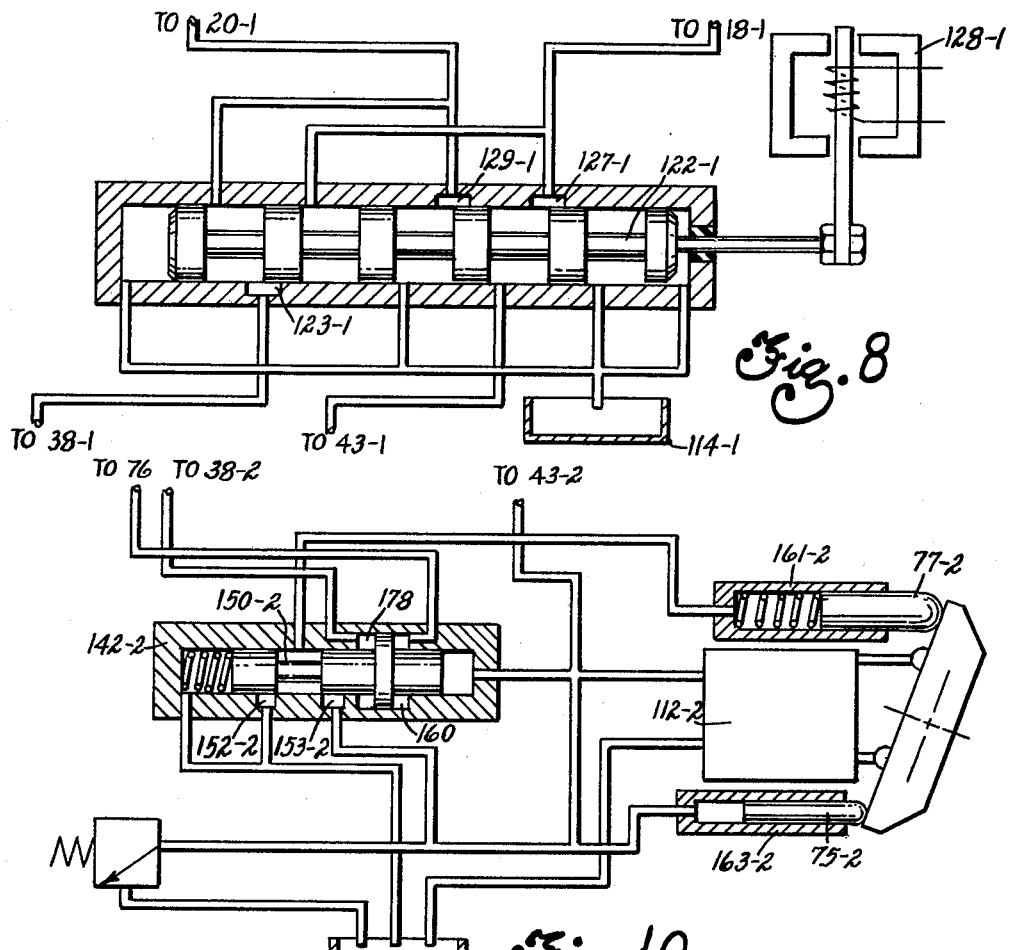
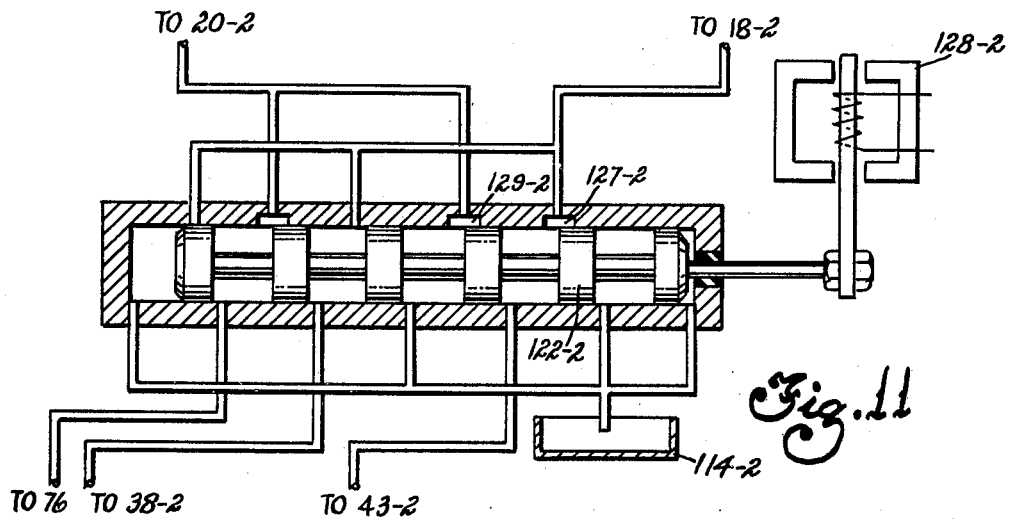

3,478,513
HYDRAULIC CONTROL SYSTEM
Carlton Y. W. Ma, Cincinnati, and Stanley A. Pfister, Wilmington, Ohio, assignors to The Cincinnati Milling Machine Co., Cincinnati, Ohio, a corporation of Ohio
Filed May 8, 1968, Ser. No. 727,542
Int. Cl. F16h 39/46, 39/50
U.S. Cl. 60—52
16 Claims

ABSTRACT OF THE DISCLOSURE

A load compensating hydaulic system which controls the output of a variable delivery pump to make it proportional to the load. When the load on a hydraulic motor is increased, pressure to the motor increases, exhaust from the motor decreases, and the difference between the two increases. Any one of these changes is then fed back to control the output from the pump to the motor which in turn makes the system load compensated.

The present invention relates to a simple and efficient hydraulic control system, particularly effective in controlling a slide or spindle of a machine tool. Numerically controlled machine tools generally utilize electro-hydraulic servo drives to power slides. One type of electro-hydraulic control that is used is a servo valve controlled hydraulic motor which tends to be quite inefficient. However, this type is very responsive to input commands. A second type of electro-hydraulic control is the servo-stroked pump driving a fixed displacement hydraulic motor. This drive is more efficient than the valve controlled motor, but it can be rather slow in response to an input signal.

The apparatus of the present invention is a compromise between the two methods mentioned above. As such, it tends to retain the efficiency of a servo stroked pump while tending to retain the responsiveness of the valve controlled motor.

When pressurized oil is flowing through a hydraulic motor and the load on the motor is increased, the pressure on the input side of the motor tends to increase, and the pressure on the exhaust side of the motor tends to decrease. By using this increase, decrease, or increase in the difference in the two as a control, the output is increased to compensate for the load increase. As a result, the system is efficient because the forward pressure is maintained no higher than it need be but is made proportional to the load.

Also, it is advantageous in the structure of the present invention to use a variable delivery pump rather than dumping the excess output of a fixed delivery pump. Excess heat is thus avoided and the system is operated at a high level of efficiency.

FIG. 1 is a schematic of a load compensated system using the input pressure to the motor as the control pressure. An electrical feedback system is also shown. The control valve spool 22 is shown stroked to the right for illustration.

FIG. 2 is an enlarged section along 2—2 of FIG. 1.

FIG. 3 is a partial schematic of an alternate embodiment which could replace that shown in phantom lines in FIG. 1 and identified by G.

FIG. 4 is an enlarged section along 4—4 of FIG. 3.

FIG. 5 is a partial schematic of an alternate embodiment which could replace that shown in phantom lines in FIG. 1 and identified by H.

FIG. 7 is a partial schematic of an alternate embodiment which could replace that shown in phantom lines in FIG. 6 and identified by G–1.

FIG. 8 is a partial schematic of an alternate embodiment of this invention which could replace that shown in phantom lines in FIG. 6 and identified by H–1.

FIG. 10 is a partial schematic of an alternate embodiment of this invention which could replace that shown in phantom lines in FIG. 9 and identified by G–2.

FIG. 11 is a partial schematic of an alternate embodiment of this invention which could replace that shown in phantom lines in FIG. 9 and identified by H–2.

Figure 6:
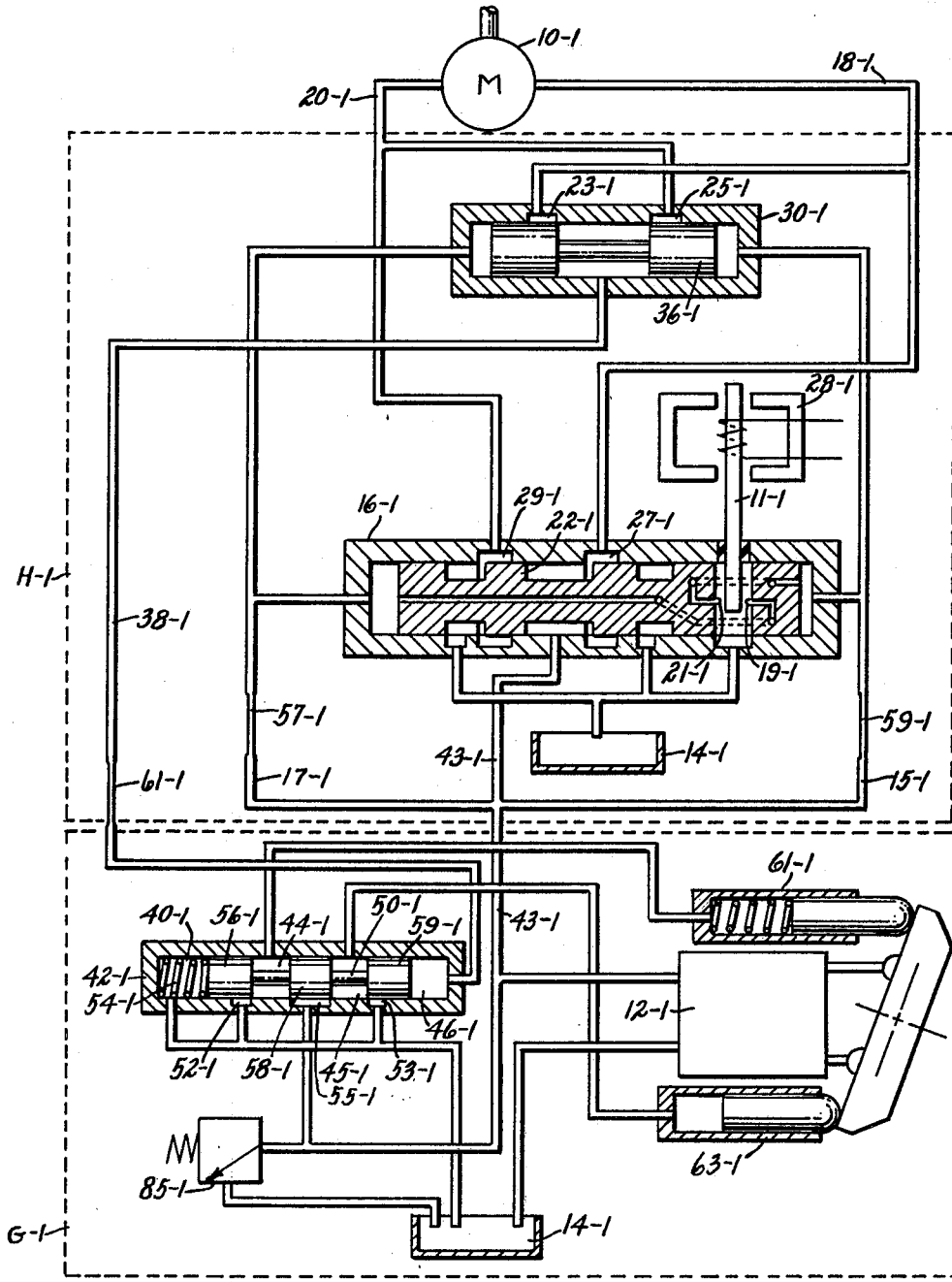
FIG. 6 is a schematic of a load compensated system using the exhaust pressure from the motor as a control pressure. The control valve spool 22–1 is shown stroked to the right for illustration.

Referring now to FIG. 1, there is shown a reversible hydraulic motor (which may be of any type, including a mere piston and cylinder arrangement), a variable delivery pump 12 which supplies fluid at a supply pressure $P_s$ to line 43, and a reservoir 14.

The motor 10 is in turn connected to a load 11 which may be a machine tool table or slide. A control valve 16 (which in this embodiment is an electro-hydraulic servo valve), for directional and speed control, connects the pump 12 to one of the motor lines 18 and 20, and the reservoir 14 to the other. Which of the lines 18 and 20 is connected to the motor 10, and which to the reservoir 14 depends on the direction of movement of the spool 22.

The direction of movement of the spool 22 of the control valve 16 is determined by the feedback system shown in the upper right of FIG. 1, which is a well known electro-hydraulic feedback system, and not claimed as a part of this invention. Such a system takes a command signal at comparator 24 and compares it to a slide position or velocity obtained through the feedback sensor 26. The amount and direction of this difference determines the amount and direction torque motor 28 moves the spool 22 (subject to a desired controlling maximum feedrate desired).

The pump 12 supplies pressurized fluid to each end of the valve 16 through line 15 and 17. Assuming that the signal from the feedback system strokes the arm 11 of the torque motor to the right, the orifice 19 is momentarily partially closed while the orifice 21 is momentarily partially opened. This momentarily increases the pressure at the left end and decreases the pressure at the right end of valve 16. As a result, the valve spool 22 is shifted to the right until it has found an equilibrium position as shown in FIG. 1. The line 18 is connected to the orifice 23 of the hydraulic rectifier 30. The line 20 is connected to the orifice 25 of the hydraulic rectifier 30. When the pressure at the left end of the valve 16 is momentarily increased, the pressure at the left end of the hydraulic rectifier 30 is also momentarily increased. Similarly, when the pressure at the right end of valve 16 is momentarily decreased, the pressure at the right end of hydraulic rectifier 30 is also momentarily decreased. These changes in pressure will shift the spool 36 of the hydraulic rectifier to the right subjecting the left chamber 40 of the relief valve 42 to the pressure in line 18 through orifice 23 and line 38.

The spool will always stay displaced in the same direction as the spool 22. For example, assuming again that the spool 22 is displaced to the right as shown in FIG. 1, there are three forces acting on the spool 22. These are the force of the fluid at the right end of valve 16, the force of the fluid at the left end of valve 16, and a "flow force" due to the fluid flowing through the orifices 27 and 29. According to Bernoulli's Law, when the spool 22 is shifted to the right, this "flow force" will tend to shift the spool 22 to the left. Thus, to overcome this "flow force,"

when the spool 22 is shifted to the right, the pressure of the fluid at the left end of valve 16 is always maintained slightly greater than that at the right end. The converse is true when the spool 22 is shifted to the left. Therefore, the displacement of the spool 36 will always be in the same direction as that of spool 22.

The relief valve 42 has a movable valve member 50 which in turn has three pistons 56, 58, and 59. The pistons divide the valve 42 into a first end chamber 40, a first central chamber 44, a second central chamber 45, and a second end chamber 46. As shown in the preceding analysis, the pressure in chamber 40 is always the same as the input pressure $P_1$ to the motor 10. The first central chamber 44 is connected to a first control piston cylinder arrangement 61 in the variable delivery pump 12. The second central chamber 45 is connected to a second control piston cylinder arrangement 63 of the variable delivery pump 12. The right end chamber 46 of relief valve 42 is connected to the supply pressure $P_s$ through line 47. The orifice 52 is connected to the relief valve 42 such that as the valve member 50 is shifted to the right, the orifice 52 is closed. The orifice 53 is connected to the relief valve 42 such that as the valve member 50 is shifted to the right the orifice 53 is opened. The biasing member 54 is used to preload the movable valve member 50 of the relief valve 42 to determine the minimum supply pressure $P_s$ or the pressure drop $P_{v1}$ across the upstream orifice (27 if the control valve spool 22 is shifted to the right, 29 if it is shifted to the left) of the valve 16. This can be proven by balancing the forces on the member 50. The force acting to the left is the supply pressure $P_s$ times the end area A of the piston 59. The force acting to the right is the force $F_s$ of the biasing member 54 plus the pressure $P_1$ at the input side of the motor 10 times the end area $A_1$ of the piston 56. The total forces acting on the spool 50 can be expressed mathematically as follows:

$$F_s + P_1 A_1 = P_s A$$

Or, since the end areas A and $A_1$ of the two pistons 59 and 56 are equal, as follows:

$$F_s/A = P_s - P_1$$

$P_s - P_1$ is the pressure drop $P_{v1}$ across the upstream orifice (27 if the control valve spool 22 is shifted to the right, 29 if it is shifted to the left) of the valve 16. Thus, the force per unit area due to the biasing member 54 equals the pressure drop across the upstream orifice of the control valve as defined by difference between $P_s$ and $P_1$ which also equals one-half the minimum supply pressure required by the system. If the load on the motor 10 increases, $P_1$ increases. Since $P_1$ is connected to chamber 40, it can be seen that this moves spool 50 to the right tending to close orifice 52 and open orifice 53. This tends to subject the first control piston cylinder arrangement 61 to the supply pressure $P_s$ through orifice 55. This also connects the second piston cylinder arrangement 63 to the reservoir 14 through orifice 53. Thus, the angle of the swash plate of the pump 12 is increased which increases the output of said pump to handle the increased load on the motor 10. Thus the pressure $P_1$ is kept proportional to the load and has made the system load compensated.

If the load on the motor is held constant, and the input is, for example, doubled by displacing spool 22 twice as far, the flow through the motor and therefore the rate of the output will also be doubled according to the formula $$Q = K X_v \sqrt{P_{v1}}$$

where $P_{v1}$ = the pressure drop across the upstream orifice (27 if the control valve spool 22 is shifted to the right, 29 if it is shifted to the left) of the valve 16; Q = the flow rate; $X_v$ = the displacement of the valve spool 22; and K = a constant. Since the pressure drop $P_{v1}$ across the orifice of the valve 16 is constant, as was proven above, and K is a constant by definition, the flow rate Q is proportional only to the displacement $X_v$ of the valve spool 22. Since Q is also the flow rate through the downstream orifice, the same formula can be applied to show that $P_{v2}$ is also constant. Thus, the system of the present invention is linear (i.e. double the displacement of valve spool 22 and the output from the motor 10 is doubled), and the output is dependent only on the displacement of spool 22 and is independent of load.

To add safety to the system, there is also shown a safety relief valve 85. Also, the restrictors 57, 59, and 61 add stability to the system. A unique feature of this invention lies in the shape of the orifices 52, 55, and 53. As is shown in more detail in FIG. 2, these orifices are angularly shaped and positioned such that the apex of the angle is the first to be exposed to and the last to be closed from the flow of fluid. Such a shaped orifice allows a gradual change in the flow rather than an abrupt change which would lead to instability.

Referring now to the FIG. 3, there is shown an alternate embodiment which could be used in place of that enclosed in phantom lines in FIG. 1 and identified by G. There is shown a variable delivery pump 112 having piston and cylinder arrangements 161 and 163. This simplifies the structure from that of a four way relief valve to that of a three way relief valve 142. The end of the piston 75 of the piston cylinder arrangement 163 is exposed to the supply pressure $P_s$, and is of smaller end area than the piston 77. In this embodiment the end area of the piston 75 is chosen to be one-half that of the piston 77. The pressure acting on the piston 77 is necessarily $P_s/2$ at any time the swash plate of the pump 112 is at equilibrium. Again, if the load on the motor 10 of FIG. 1 were to be increased, the input pressure $P_1$ would also be increased. This would increase the pressure in line 38 which in turn would increase the pressure in chamber 140. This would move the valve member 150 to the right, exposing the piston 77 to a greater percentage of a supply pressure $P_s$ through orifice 153. Likewise, if the input pressure $P_1$ to the motor 10 were decreased, the movable valve member 150 would move to the left, exposing the fluid adjacent to the end area of the piston 77 to the reservoir 114. Thus, the angle of the swash plate of the pump is changed to compensate for the change in load. Following the same analysis as that for FIG. 1 it can be shown again that $F_s/A$ equals $P_s$ minus $P_1$. Similarly, the system can be shown to be linear as well as load compensated.

Again, a unique feature of this invention lies in the shape of the orifices 152 and 153. These are shown in more detail in FIG. 4. The orifices are angularly shaped and positioned such that the apex of the angle is the first to be exposed to and the last to be closed from the flow of fluid through said orifices. Such a shaped orifice allows a gradual change in the flow rather than an abrupt change which would lead to instability.

Referring again to FIG. 1, and more particularly to that of FIG. 1 enclosed in phantom lines and identified by H, it is clear that what is desired is that the spool 22 of the control valve 16 and the spool 36 of the hydraulic rectifier valve 30 move in the same direction. Clearly this can be accomplished by other means than that shown in FIG. 1. The two spools could be mechanically connected to one another or they could be physically connected and made a part of the same valve. The second mentioned system is shown in FIG. 5. The control valve spool 122 is again shown shifted to the right for illustration. The fluid then flows through line 43, through orifice 127, into line 18, through motor 10, into line 20, through orifice 129, and into the reservoir 114. The pressure $P_1$ in line 18 is also connected to orifice 123. Clearly, if valve spool 122 had been displaced to the left, the input pressure to the motor 10 would be through line 20 which in turn would then be connected to the orifice 123. The orifice 123 again leads to line 38 which is connected to chamber 40 of the relief valve 42. Thus, the rectifier valve spool is integral with the control valve spool 122.

Also, the manner of controlling the displacement of the control valve spool 122 can be by mechanical connection to the torque motor 128 as shwn in FIG. 5. Clearly this displacement could also be controlled through using pilot pressures as in FIG. 1. Also the feedback arrangement could be of a different type. If, for example, numerical control were not desired, the control valve spool 122 could be displaced manually, or it could be controlled by mechanical feedback from the load.

Further, the purpose of the hydraulic rectifier 30 is to expose the chamber 40 of the relief valve 42 to the pressure at the input side of motor 10. This also could be accomplished in other ways, for example, by a series of check valving.

This specification has thus far described a hydraulic system in which the control pressure to the relief valve is the input pressure to the hydraulic motor. However, when the load on a hydraulic motor increases, not only does the input pressure to that motor increase, but the exhaust pressure from that motor decreases. The converse is true if the load on the motor decreases. The embodiments of this invention shown in FIGS. 6–8 illustrate how this change in the exhaust pressure can be used to control the input to the motor.

Referring now to FIG. 6, there is shown a reversible hydraulic motor 10–1 (which may be of any type, including a mere piston and cylinder arrangement), a variable delivery pump 12–1 which supplies fluid at a supply pressure $P_s$ to line 43–1, and a reservoir 14–1.

The motor 10–1 is in turn connected to a load (not shown) which may be a machine tool table or slide. A control valve 16–1 (which in this embodiment is an electro-hydraulic servo valve), for directional and speed control, connects the pump 12–1 to one of the motor lines 18–1 or 20–1 and the reservoir 14–1 to the other. Which of the lines 18–1 and 20–1 is connected to the pump 12–1 and which to the reservoir 14–1 depends on the direction of movement of the spool 22–1.

The direction of movement of the spool 22–1 of the control valve 16–1 is determined by a feedback system similar to that shown in the upper right of FIG. 1, which is a well known electro-hydraulic feedback system, and not claimed as a part of this invention, nor is it repeated in FIG. 6.

The pump 12–1 supplies pressurized fluid to each end of the valve 16–1 through lines 15–1 and 17–1. Assuming that the signal from the feedback system strokes the arm 11–1 of the torque motor 28–1 to the right, the orifice 19–1 is momentarily partially closed while the orifice 21–1 is momentarily partially opened. This momentarily increases the pressure at the left end and decreases the pressure at the right end of valve 16–1. As a result the valve spool 22–1 is shifted to the right until it has found an equilibrium position as shown in FIG. 6. The line 18–1 is connected to the orifice 23–1 of the hydraulic rectifier 30–1. The line 20–1 is connected to the orifice 25–1 of the hydraulic rectifier 30–1. When the pressure at the left end of the valve 16–1 is momentarily increased, the pressure at the left end of the hydraulic rectifier 30–1 is also momentarily increased. Similarly, when the pressure at the right end of valve 16–1 is momentarily decreased, the pressure at the right end of hydraulic rectifier 30–1 is also momentarily decreased. These changes in pressure will shift the spool 36–1 of the hydraulic rectifier to the right subjecting the right chamber 46–1 of the relief valve 42–1 to the pressure in line 20–1 through orifice 25–1 and line 38–1.

It should be noted that the spool 36–1 will always stay displaced in the same direction as the spool 22–1 as again can be shown by applying Bernoulli's law.

The relief valve 42–1 has a movable valve member 50–1 which in turn has three pistons 56–1, 58–1, and 59–1. The pistons divide the valve 42–1 into a first end chamber 40–1, a first central chamber 44–1, a second central chamber 45–1, and a second end chamber 46–1. As shown in the preceding analysis, the pressure in chamber 46–1 is always the same as the exhaust pressure $P_2$ from the motor 10–1. The first central chamber 44–1 is connected to a first control piston cylinder arrangement 61–1 in the variable delivery pump 12–1. The second central chamber 45–1 is connected to a second control piston cylinder arrangement 63–1 of the variable delivery pump 12–1. The left end chamber 40–1 relief valve 42–1 is connected to the reservoir 14–1. The orifice 52–1 is connected to the relief valve 42–1 such that as the valve member 50–1 is shifted to the right, the orifice 52–1 is closed. The orifice 53–1 is connected to the relief valve 42–1 such that as the valve member 50–1 is shifted to the right the orifice 53–1 is opened. The biasing member 54–1 is used to preload the movable valve member 50–1 of the relief valve 42–1 to determine the minimum supply pressure $P_s$ or the pressure drop $P_{v2}$ across the downstream orifice (29–1 if the control valve spool 22–1 is shifted to the right, 27–1 if it is shifted to the left) of the valve 16. This can be proven by balancing the forces on the member 50–1. The force acting to the left is the exhaust pressure $P_2$ times the end area $A_1$ of the piston 59–1. The force acting to the right is the force $F_s$ of the biasing member 54–1. The total forces acting on the spool 50 can be expressed mathematically as follows:

$$F_s = P_2 A_1$$

or $$F_s/A_1 = P_2$$

$P_2$ is the pressure drop $P_{v2}$ across the downstreams orifice (29–1 if the control valve spool 22–1 is shifted to the right, 27–1 if it is shifted to the left) of the valve 16–1. Thus, the force per unit area due to the biasing member 54–1 equals the pressure drop across the downstream orifice of the control valve as defined by the exhaust pressure $P_2$, which is also equal to one-half the minimum supply pressure required by the system. If the load on the motor 10–1 increases, $P_2$ decreases. Since $P_2$ is connected to chamber 46–1, it can be seen that this moves spool 50–1 to the right tending to close orifice 52–1 and open orifice 53–1. This tends to subject the first piston cylinder arrangement 61–1 to the supply pressure $P_s$ through orifice 55–1. This also connects piston cylinder arrangement 63–1 to the reservoir 14 through orifice 53–1. Thus, the angle of the swash plate of the pump 12–1 is increased which increases the output of said pump to handle the increased load on the motor 10–1. Thus, the pressure to the motor 10–1 is kept proportional to the load and has made the system load compensated.

By following a similar analysis as that for FIG. 1, it can be shown that the system of this embodiment is also linear (i.e. double the displacement of valve spool 22–1 and the output from the motor 10–1 is doubled). Also, as shown above, the output is dependent only on the displacement of the spool 22–1 and is independent of load.

To add safety to the system, there is also included a safety relief valve 85–1. Also, the restrictors 57–1, 59–1, and 61–1 add stability to the system. A unique feature of this invention lies in the shape of the orifices 52–1, 55–1, and 53–1. These orifices are angularly shaped and positioned such that the apex of the angle is the first to be exposed to and the last to be closed from the flow of fluid. Thus, they are similar to those shown in FIG. 2. Such a shaped orifice allows a gradual change in the flow rather than an abrupt change which would lead to instability.

Referring now to the FIG. 7, there is shown an alternate embodiment which could be used in place of that enclosed in phantom lines in FIG. 6 and identified by G–1. There is shown a variable delivery pump 112–1 having piston and cylinder arrangements 161–1 and 163–1. This simplifies the structure from that of a four way relief to that of a three way relief valve 142–1. The end of the piston 75-1 of the piston cylinder arrangement 163-1 is exposed to the supply pressure $P_s$, and is of smaller end area than the piston 77-1. In this embodiment the end area of the piston 75-1 is chosen to be one-half that of the piston 77-1. The pressure acting on the piston 77-1 is necessarily $P_s/2$ at any time the swash plate of the pump 112-1 is at equilibrium. Again, if the load on the motor 10-1 of FIG. 6 were to be increased, the exhaust pressure $P_2$ would be decreased. This would decrease the pressure in line 38-1 which in turn would decrease the pressure in chamber 146-1. This would move the valve member to the right, exposing the piston 77-1 to a greater percentage of a supply pressure $P_s$ through orifice 153-1. Likewise, if the output pressure $P_2$ to the motor 10-1 were increased, the movable valve member 150-1 would move to the left, exposing the fluid adjacent to the end area of the piston 77-1 to the reservoir 114-1. Following the same analysis as that for FIG. 6 it can be shown again that $F_s/A$ equals $P_2$. Similarly, the system can be shown to be linear as well as load compensated.

Again, a unique feature of this invention lies in the shape of the orifices 152-1 and 153-1. These are similar to orifices 152 and 153 shown in more detail in FIG. 4. The orifices are angularly shaped and positioned such that the apex of the angle is the first to be exposed to and the last to be closed from the flow of fluid through said orifices. Such a shaped orifice allows a gradual change in the flow rather than an abrupt change which would lead to instability.

Referring again to FIG. 6, and more particularly to that part of FIG. 6 enclosed in phantom lines and identified by H-1, it is clear that what is desired is that the spool 22-1 of the control valve 16-1 and the spool 36-1 of the hydraulic rectifier valve 30-1 move in the same direction. Clearly, this can be accomplished by other apparatus than that shown in FIG. 6. The two spools could be mechanically connected to one another or they could be physically connected and made a part of the same valve. The second mentioned system is shown in FIG. 8. The control valve spool 122-1 is again shown shifted to the right for illustration. The fluid then flows through line 43-1, through orifice 127-1, into line 18-1, through motor 10-1, into line 20-1, through orifice 129-1, and into the reservoir 141-1. The pressure $P_2$ in line 20-1 is also exposed to orifice 123-1. Clearly, if valve spool 122-1 had been displaced to the left, the input pressure to the motor 10-1 would be through line 20-1 and the pressure in line 18-1 would then be exposed to the orifice 123-1. The orifice 123-1 again leads to line 38-1 which is connected to chamber 46-1 of the relief valve 42-1. Thus the rectifier valve spool is integral with the control valve spool 122-1. Also, the manner of controlling the displacement of the control valve spool 122-1 can be by mechanical connection to the torque motor 128-1 as again shown in FIG. 8. Clearly, this displacement could be controlled through using pilot pressures as in FIG. 6. Also, the feedback arrangement could be of a different type. If, for example, numerical control were not desired, the control valve spool 122-1 could be displaced manually, or it could be controlled by mechanical feedback from the load.

Further, the purpose of the hydraulic rectifier 30-1 is to expose the chamber 46-1 of the relief valve 42-1 to the pressure at the exhaust side of motor 10-1. This also could be accomplished in other ways, for example, by a series of check valving.

Thus, there have been shown systems which compensate for varying loads using the input pressure to or the exhaust pressure from the motor to control the output of the pump.

Figure 9:
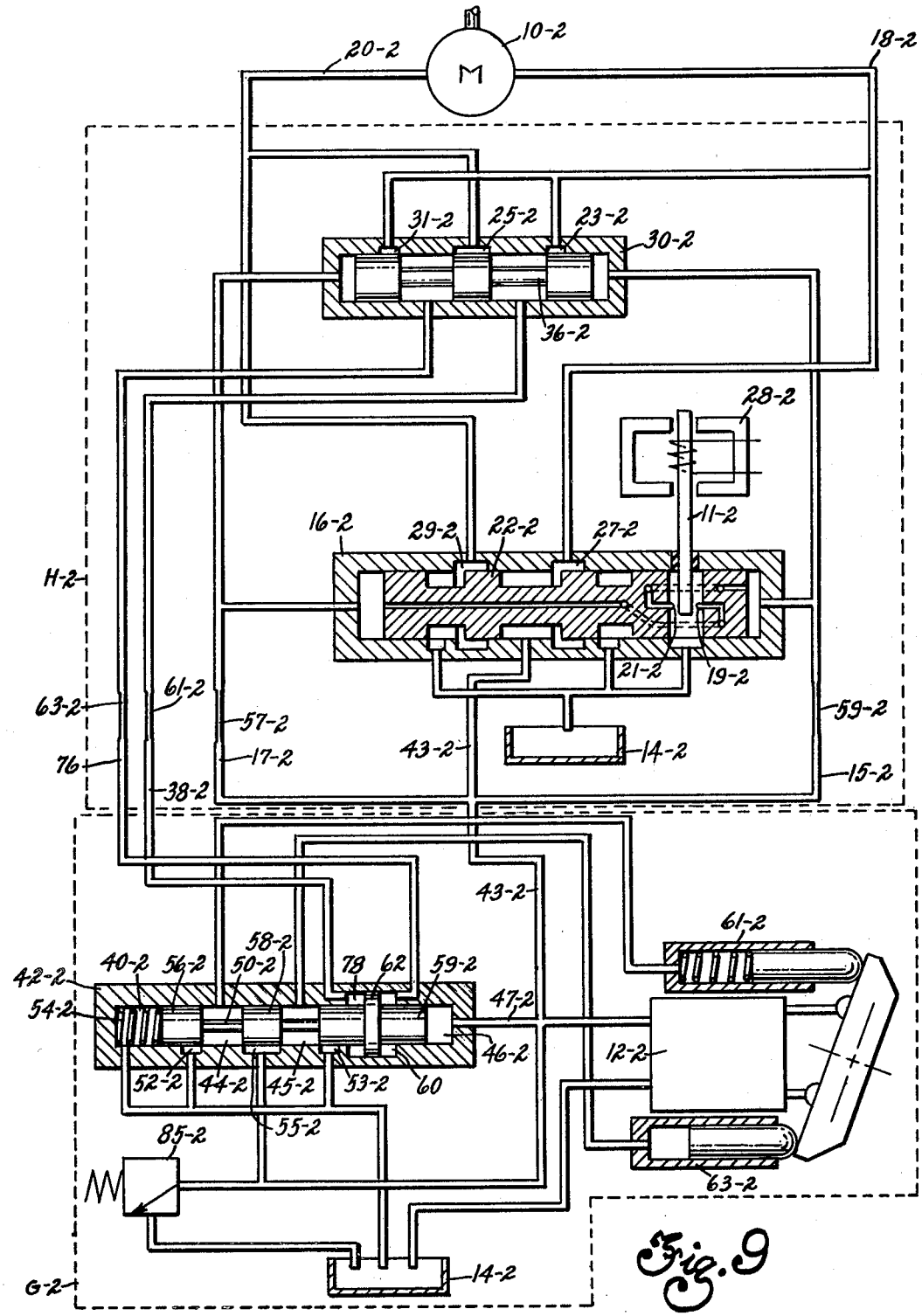
FIG. 9 is a schematic of a load compensated system using the difference between the input and exhaust pressures of the motor as the control pressure. The control valve spool 22–2 is shown stroked to the right for illustration.

A third embodiment is shown in FIGS. 9-11. This embodiment uses the change in the difference between the input pressure to, and the exhaust pressure from the motor for controlling the output of the pump. The system is designed such that the *total* pressure drop across the orifices of the control valve 16-2 is constant.

Referring now to FIG. 9, there is shown a reversible hydraulic motor 10-2 (which may be of any type, including a mere piston and cylinder arrangement), a variable delivery pump 12-2 which supplies fluid at a supply pressure $P_s$ to line 43-2, and a reservoir 14-2.

The motor 10-2 is in turn connected to a load (not shown) which may be a machine tool table or slide. A control valve 16-2 (which in this embodiment is an electro-hydraulic servo valve), for directional and speed control, connects the pump 12-2 to one of the motor lines 18-2 and 20-2, and the reservoir 14-2 to the other. Which of the lines 18-2 and 20-2 is connected to the pump 12-2 and which to the reservoir 14-2 depends on the direction of movement of spool 22-2.

The direction of movement of the spool 22-2 of the control valve 16-2 is determined by a feedback system similar to that shown in the upper right of FIG. 1, which is a well known electro-hydraulic feedback system, and not claimed as a part of this invention nor is it repeated in FIG. 9.

The pump 12-2 supplies pressurized fluid to each end of the valve 16-2 through line 15-2 and 17-2. Assuming that the signal from the feedback system strokes the arm 11-2 of the torque motor 28-2 to the right, the orifice 19-2 is momentarily partially closed while the orifice 21-2 is momentarily partially opened. This momentarily increases the pressure at the left end and decreases the pressure at the right end of valve 16-2. As a result the valve spool 22-2 is shifted to the right until it has found an equilibrium position as shown in FIG. 9. The line 18-2 is connected to the orifices 23-2 and 31-2 of the hydraulic rectifier 30-2. The line 20-2 is connected to the orifice 25-2 of the hydraulic rectifier 30-2. When the pressure at the left end of the valve 16-2 is momentarily increased, the pressure at the left end of the hydraulic rectifier 30-2 is also momentarily increased. Similarly, when the pressure at the right end of valve 16-2 is momentarily decreased, the pressure at the right end of hydraulic rectifier 30-2 is also momentarily decreased. These changes in pressure will shift the spool 36-2 of the hydraulic rectifier to the right subjecting the left enlarged chamber 78 of the relief valve 42-2 to the pressure in line 18-2 through orifice 23-2 and line 38-2. Also, the right enlarged chamber 60 will be subjected to the pressure in line 20-2 through orifice 25-2 and line 76.

The spool 36-2 will always stay displaced in the same direction as the spool 22-2 as can again be shown by applying Bernoulli's law.

The relief valve 42-2 has a movable valve member 50-2 which in turn has three pistons 56-2, 58-2, and 59-2. The pistons divide the valve 42-2 into a first end chamber 40-2, a first central chamber 44-2, a second central chamber 45-2, and a second end chamber 46-2. Also, the enlarged sleeve piston 62 further divides the valve 42-2 into a first enlarged chamber 78 and a second enlarged chamber 60. As shown in the preceding analysis, the pressure in chamber 78 is always the same as the input pressure $P_1$ to the motor 10-2 and the pressure in chamber 60 is always the same as the exhaust pressure $P_2$. The first central chamber 44-2 is connected to a first control piston cylinder arrangement 61-2 in the variable delivery pump 12-2. The second central chamber 45-2 is connected to a second control piston cylinder arrangement 63-2 of the variable delivery pump 12-2. The right end chamber 46-2 of relief valve 42-2 is connected to the supply pressure $P_s$ through line 47-2. The orifice 52-2 is connected to the relief valve 42-2 such that as the valve member 50-2 is shifted to the right, the orifice 52-2 is closed. The orifice 53-2 is connected to the relief valve 42-2 such that as the valve member 50-2 is shifted to the right the orifice 53-2 is opened. The biasing member 54-2 is used to preload the movable valve member 50-2 of the relief valve 42-2 to determine the minimum supply pressure $P_s$ or the total pressure drop $P_v$ across the orifices 27–2 and 29–2 of the valve 16–2. This can be proven by balancing the forces on the member 50–2. The force acting to the left is the supply pressure $P_s$ times the end area A of the piston 59–2, plus the exhaust pressure $P_2$ times the end area $A_2$ of the enlarged sleeve piston 62. The force acting to the right is the force $F_s$ of the biasing member 54–2 plus the pressure $P_1$ at the input side of the motor 10–2 times the end area $A_2$, of the piston 60. The total forces acting on the spool 50–2 can be expressed mathematically as follows:

$$F_s + P_1 A_2 = P_s A + P_2 A_2$$

Or, since the end areas A and $A_2$ of the two pistons 59–2 and 62 are designed to be equal, as follows:

$$F_s/A = (P_s - P_1) + P_2$$

$P_s - P_1$ is the pressure drop $P_{v1}$ across the upstream orifice (27–2 if the control valve spool 22–2 is shifted to the right, 29–2 if it is shifted to the left) of the valve 16–2, and $P_2$ is the pressure drop $P_{v2}$ across the downstream orifice. Thus, the force per unit area due to the biasing member 54–2 equals the total pressure drop across the orifices (27–2 and 29–2) of the control valve 16–2 as defined by $P_2$ plus the difference between $P_s$ and $P_1$. If the load on the motor 10–2 increases, $P_1$ increases and $P_2$ decreases. Since $P_1$ is connected to chamber 78 and $P_2$ is connected to chamber 60, it can be seen that this moves spool 50–2 to the right and opens orifice 53–2. This tends to subject the first piston cylinder arrangement 61–2 to the supply pressure $P_s$ through orifice 55–2. This also tends to subject piston cylinder arrangement 63–2 to the reservoir 14–4 through orifice 53–2. Thus, the angle of the wash slate of the pump 12–2 is increased which increases the output of said pump to handle the increased load on the motor 10–2. Thus the pressure to the motor 10–2 is kept proportional to the load and has made the system load compensated.

If the load on the motor 10–2 is held constant, and the input is, for example, doubled by displacing spool 22–2 twice as far, the flow through the motor and therefore the output will also be doubled according to the formula $$Q = K X_v \sqrt{P_v}$$

Where $P_v$=the total pressure drop across the orifice 27–2 and 29–2 of the valve 16–2; Q=the flow rate; $X_v$=the displacement of the valve spool 22–2; and K=a constant. Since the total pressure drop $P_v$ across the orifices 27–2 and 29–2 of the valve 16–2 is constant, as was proven above, and K is a constant, by definition, the flow rate Q is proportional to displacement $X_v$ of the valve spool 22–2. By following a similar analysis as that for FIG. 1, it can be shown that the system of this embodiment is linear (i.e. double the displacement of valve spool 22–2 and the output from the motor 10–2 is doubled). Also, as shown above, the output is dependent only on the displacement of spool 22–2 and is independent of load.

To add safety to the system, there is also shown a safety relief valve 85–2. Also, the restrictors 57–2, 59–2, 61–2, and 63–2 add stability to the system. A unique feature of this invention lies in the shape of the orifices 52–2, 55–2, and 53–2. These are angularly shaped and positioned such that the apex of the angle is the first to be exposed to and the last to be closed from the flow of fluid. Thus, they are similar to those shown in FIG. 2. Such a shaped orifice allows a gradual change in the flow rather than an abrupt change which would lead to instability.

Referring now to the FIG. 10, there is shown an alternate embodiment which could be used in place of that enclosed in phantom lines in FIG. 9 and identified by G–2. There is shown a variable delivery pump 112–2 having piston cylinder arrangements 161–2 and 163–2. This simplifies the structure from that of a four way relief valve to that of a three way relief valve 142–2. The end of the piston 75–2 of the piston cylinder arrangement 163–2 is exposed to the supply pressure $P_s$, and is of smaller end area than the piston 77–2. In this embodiment the end area of the piston 75–2 is chosen to be one-half that of the piston 77–2. The pressure acting on the piston 77–2 is necessarily $P_s/A$ at any time the swash plate of the pump 112–2 is at equilibrium. Again, if the load on the motor 10–2 of FIG. 9 were to be increased, the input pressure $P_1$ would also be increased and the exhaust pressure $P_2$ would be decreased. This would increase the pressure in line 38–2 which in turn would increase the pressure in chamber 178. It would also decrease the pressure in line 76 and, in turn, this would move the valve member 150–2 to the right, expose the piston 77–2 to a greater percentage of a supply pressure $P_s$ through orifice 153–2. Likewise, if the input pressure $P_1$ to the motor 10–2 were decreased, and the exhaust pressure $P_2$ increased the movable valve member 150–2 would move to the left, exposing the fluid adjacent to the end area of the piston 77–2 to the reservoir 114–2. Following the same analysis as that for FIG. 9 it can be shown again that $F_s/A = P_2 + P_s - P_1$. Similarly, the system can be shown to be linear as well as load compensated.

Again a unique feature of this invention lies in the shape of the orifices 152–2 and 153–2. These are similar to orifices 152 and 153 shown in more detail in FIG. 4. The orifices are angularly shaped and positioned such that the apex of the angle is the first to be exposed to and the last to be closed from the flow of fluid through said orifices. Such a shaped orifice allows a gradual change in the flow rather than an abrupt change which would lead to instability.

Referring again to FIG. 9, and more particularly to that part of FIG. 9 enclosed in phantom lines and identified by H–2, it is clear that what is desired is that the spool 22–2 of the control valve 16–2 and the spool 36–2 of hydraulic rectifier valve 30–2 move in the same direction. Clearly, this can be accomplished by other means than that shown in FIG. 9. The two spools could be mechanically connected to one another or they could be physically connected and made a part of the same valve. The second mentioned system is shown in FIG. 11. The control valve spool 122–2 is again shown shifted to the right to illustration. The fluid then flows through line 43–2, through orifice 127–2, into line 18–2, through motor 10–2, into line 20–2, through orifice 129–2, and into the reservoir 142–2. The pressure $P_1$ in line 18–2 is also connected to line 38–2. The pressure $P_2$ in line 20–2 is also connected to line 76. Clearly, if valve spool 122–2 had been displaced to the left, the input pressure to the motor 10–2 would be through line 20–2 which in turn would then be connected to line 38–2. Also, line 18–2 would be connected to line 76. Line 38–2 again leads to chamber 78, and line 76 leads to chamber 60. Thus, the rectifier valve spool is integral with the control valve spool 122–2. Also, the manner of controlling the displacement of the control valve spool 122–2 can be by mechanical connection to the torque motor 128–2 as again shown in FIG. 11. Clearly, this displacement could be controlled through using pilot pressures as in FIG. 9. Also the feedback arrangement could be of a different type. If, for example, numerical control were not desired, the control valve spool 122–2 could be displaced manually, or it could be controlled by mechanical feedback from the load.

Further, the purpose of the hydraulic rectifier 30–2 is to expose the chambers 78 and 60 of the relief valve 42–2 to the pressures at the input side and exhaust side respectively of motor 10–2. This also could be accomplished in other ways, for example, by a series of check valving.

While the invention has been described in connection with several possible forms or embodiments thereof, it is to be understood that the present disclosure is illustrative rather than restrictive and that changes and modifications may be made without departing from the spirit of the invention or the scope of the claims which follow.

What is claimed is:

1. In a load compensating hydraulic system having a variable delivery pump, a reservoir, and a motor, the output of said pump being dependent on a control pressure, the improvement comprising:
  (a) a control valve selectively interconnecting one side of the motor with the output of the pump and the other side of the motor with the reservoir, said control valve having a movable valve member therein the displacement of which determines the rate of flow to the motor;
  (b) a relief valve connected to the pump for supplying the control pressure thereto, said relief valve also being connected to at least one side of said control valve;
  (c) a hydraulic rectifier interconnecting at least one other side of the control valve to said relief valve such that an increase or decrease in the pressure drop across said control valve is compensated by a change in the control pressure which results respectively in a decrease or increase in the output of the pump.

2. A load compensating hydraulic system comprising:
  (a) a variable delivery pump;
  (b) a reversible motor;
  (c) a reservoir;
  (d) a control valve selectively interconnecting one side of said motor with the output side of said pump and the other side of said motor with said reservoir;
  (e) a relief valve connected to said pump and interconnecting said pump with said reservoir, said relief valve having a movable valve member the displacement of which determines the output from said pump to said load; and
  (f) a hydraulic rectifier interconnecting at least one of the sides of the motor to the relief valve such that the displacement of said movable member is dependent on the pressure at at least one of the sides.

3. In a load compensating hydraulic system having a reservoir containing hydraulic fluid and a reversible motor having a side subject to the fluid at a first pressure and a side subject to the fluid at a second pressure, the improvement comprising:
  (a) a variable delivery pump which delivers fluid at a third pressure, said pump having
    (1) an angularly adjustable swash plate, the angle of which controls the output of the pump,
    (2) two piston and cylinder arrangements, on diametrically opposite sides of said swash plate, one end of each piston contacting said swash plate such that the relative extension of the pistons controls the angle of said swash plate;
  (b) a control valve selectively interconnecting one side of the motor to the third pressure line and the other side of the motor to the reservoir;
  (c) a relief valve having
    (1) at least one first orifice, each said first orifice interconnecting the reservoir with one of the piston and cylinder arrangement of said pump,
    (2) a second orifice selectively interconnecting the pump with at least one of the piston and cylinder arrangements,
    (3) a movable valve member which variably blocks said orifices, and
    (4) a biasing member which biases said movable member in one direction; and
  (d) a hydraulic rectifier connected to said control valve and interconnecting at least one of the sides of the motor with said relief valve such that the displacement of said movable member in the one direction depends on the force of said biasing member and at least one of the pressures.

4. A system as claimed in claim 3 wherein said orifices are angularly shaped and positioned such that the apex of the angle of said orifices is the first to be opened and the last to be blocked by displacement of said movable member.

5. In a load compensating hydraulic system having a reservoir containing fluid, a reversible motor having a first side subject to the fluid at a first pressure and a second side subject to the fluid at a second pressure, and a variable delivery pump which delivers fluid at a third pressure, said pump having a swash plate the angle of which determines the output of the pump and two piston and cylinder arrangements on diametrically opposite sides of said swash plate, the pistons contacting said swash plate such that the relative extension of said pistons determines the angle of said swash plate, the improvement comprising:
  (a) a control valve selectively interconnecting one side of the motor to the pump and the other side of the motor to the reservoir;
  (b) a relief valve having,
    (1) a movable valve member having three spaced interconnected pistons which divide said relief valve into a first and second end chamber and a first and second central chamber, each of the central chambers being connected to one of the piston and cylinder arrangements of said pump,
    (2) a first orifice interconnecting the reservoir with the first central chamber of said relief valve, said first orifice being variably blocked by one end piston of said movable member,
    (3) a second orifice interconnecting the reservoir with the second central chamber of said relief valve, said second orifice being variably blocked by the other end piston of said movable member,
    (4) a third orifice interconnecting the pump with the central chambers of said relief valve, said third orifice being variably blocked by the center piston of said movable member such that displacement of said movable member in one direction exposes the first central chamber to said third orifice and closes the first central chamber to said first orifice, the displacement in one direction also exposes said second orifice to the second central chamber and closes said third orifice to the second central chamber such that the displacement of said valve member determines the output of the pump, and
    (5) a biasing member in one end chamber which biases said movable member in the one direction; and
  (c) a hydraulic rectifier connected to said control valve and interconnecting at least one of the sides of the motor with said relief valve such that the displacement of said movable member is dependent on the force of the biasing member and at least one of pressures.

6. A system as claimed in claim 5 wherein said orifices are angularly shaped and positioned such that the apex of the angle of said orifices is the first to be opened and the last to be blocked by displacement of said movable member.

7. In a load compensating hydraulic system having a reservoir containing fluid and a reversible motor having a first side subject to the fluid at a first pressure and a second side subject to the fluid at a second pressure, the improvement comprising;
  (a) a variable delivery pump which delivers fluid at a third pressure, said pump having,
    (1) a swash plate the angle of which determines the output of the pump,
    (2) a first piston and cylinder arrangement, the piston of which contacts the swash plate tending to increase the angle thereof; and
    (3) a second piston and cylinder arrangement parallel with said first arrangement and on the diametrically opposite side of said swash plate from said first arrangement, the piston of said second arrangement contacting the swash plate tending to decrease the angle thereof, said second piston having an end area a fraction of the end area of said first piston;

(b) a control valve selectively interconnecting one side of the motor with the pump and the other of the motor with the reservoir;

(c) a relief valve connected to said pump, said relief valve having, (1) a movable valve member having two spaced interconnected pistons which divide said relief valve into two end chambers and a center chamber, said center chamber being connected to said first piston and cylinder arrangement, (2) a first orifice interconnecting said center chamber with the reservoir, said first orifice being variably blocked by one piston of said movable member such that displacement of said movable member in one direction tends to close said first orifice, (3) a second orifice interconnecting the center chamber and the pump, said second orifice being variably blocked by the other piston of said movable member such that displacement of said movable member in the one direction tends to open said second orifice, and (4) a biasing member in one end chamber, said biasing member biasing said movable member in the one direction; and (d) a hydraulic rectifier connected to said control valve and interconnecting at least one of the sides of the motor with said relief valve such that the displacement of said movable member depends on the force of said biasing member and at least one of the pressures.

8. A system as claimed in claim 7 wherein said orifices are angularly shaped and positioned such that the apex of the angle of said orifice is the first to be opened and the last to be blocked by displacement of said movable member.

9. In a load compensating hydraulic system having a reservoir containing fluid and a reversible motor, the improvement comprising:

(a) a variable delivery pump having, (1) a swash plate the angle of which determines the output of the pump, (2) a first piston and cylinder arrangement the piston of which contacts the swash plate tending to increase the angle thereof, and (3) a second piston and cylinder arrangement parallel with said first arrangement and on the diametrically opposite side of said swash plate from said first arrangement, the piston of said second arrangement contacting the swash plate tending to decrease the angle thereof;

(b) a control valve selectively interconnecting one side of the motor to the pump and the other side of the motor to the reservoir;

(c) a relief valve having, (1) a movable valve member having three spaced interconnected pistons which divide said relief valve into a first and second end chamber and a first and second central chamber, the first central chamber being connected to said first piston and cylinder arrangement and the second central chamber being connected to the second piston and cylinder arrangement, the second end chamber being connected to the output of the pump, (2) a first angularly shaped orifice interconnecting the first central chamber with the reservoir, said first orifice being variably blocked by one end piston and positioned such that displacement of said movable member in one direction tends to close said first angular orifice at the apex of the angle, (3) a second angularly shaped orifice interconnecting the second central chamber with the reservoir, said second orifice being variably blocked by the other end piston and positioned such that displacement of said movable member in the one direction tends to open said second angular orifice at the apex of the angle, (4) a third angularly shaped orifice interconnecting the pump with the central chambers of said relief valve, said orifice being variably blocked by the center piston of said movable member and positioned such that displacement of said movable member in the one direction tends to close said third angular orifice to the second central chamber at an apex of the orifice and open said third orifice to the first central chamber at an apex of the orifice, and (5) a biasing member in one end chamber which biases said movable member in the one direction; and (c) a hydraulic rectifier interconnecting the first end chamber with the one side of the motor such that the displacement of said movable member in the one direction is dependent on the force of said biasing member plus the pressure at the one side of the motor minus the pressure of the fluid at the pump.

10. In a load compensating hydraulic system having a reservoir containing fluid and a reversible motor, the improvement comprising:

(a) a variable delivery pump having, (1) a swash plate the angle of which determines the output of the pump, (2) a first piston and cylinder arrangement the piston of which contacts said swash plate tending to increase the angle thereof, and (3) a second piston and cylinder arrangement parallel with said first arrangement and on the diametrically opposite side of said swash plate from said first arrangement, the piston of said second arrangement contacting said swash plate tending to decrease the angle thereof;

(b) a control valve selectively interconnecting one side of the motor with the pump and the other side of the motor with the reservoir;

(c) a relief valve having, (1) a movable member having three spaced interconnected pistons which divide said relief valve into a first and second end chamber, and a first and second central chamber, said first central chamber being connected to said first piston and cylinder arrangement, said second central chamber being connected to said second piston and cylinder arrangement, and said first end chamber being connected to the reservoir, (2) a first angularly shaped orifice interconnecting the first central chamber with the reservoir, said first orifice being variably blocked by one end piston and positioned such that displacement of said movable member in one direction tends to close said first angular orifice at the apex of the angle, (3) a second angularly shaped orifice interconnecting the second central chamber with the reservoir, said second orifice being variably blocked by the other end piston and positioned such that displacement of said movable member in the one direction tends to open said second angular orifice at the apex of the angle, (4) a third angularly shaped orifice interconnecting the pump with the central chambers of said relief valve, said third orifice being variably blocked by the center piston of said movable member and positioned such that displacement of said movable member in one direction tends to close said third angular orifice to the second central chamber at the apex of an angle and tends to open said third orifice to the first central chamber at the apex of an angle, and (5) a biasing member in one end chamber which biases said movable member in the one direction; and (c) a hydraulic rectifier interconnecting the second end chamber with the other side of the motor such that the displacement of said movable member in the one direction is dependent on the force of said biasing member minus the pressure at the other side of the motor.

11. A load compensating hydraulic system having a reservoir containing fluid and a reversible motor, the improvement comprising:

(a) a variable delivery pump having,
(1) a swash plate the angle of which determines the output of the pump,
(2) a first piston and cylinder arrangement, the piston of which contacts the swash plate tending to increase the angle thereof, and
(3) a second piston and cylinder arrangement parallel with said first arrangement, the piston of said second arrangement contacting the swash plate tending to decrease the angle thereof, said second piston having an end area a fraction of the end area of said first piston;

(b) a control valve selectively interconnecting one side of the motor with the pump and the other side of the motor with the reservoir;

(c) a relief valve having,
(1) a movable valve member having two spaced interconnected pistons which divide said relief valve into a first end chamber, a center chamber and a second end chamber, said center chamber being connected to said first piston and cylinder arrangement such that the end area of said first piston is exposed to the pressure in said center chamber, said second end chamber being connected to the pump such that said second end chamber is exposed to the pressure at the output of said pump,
(2) a first angularly shaped orifice interconnecting the center chamber with the reservoir, said first orifice being variably blocked by one piston of said movable valve member and positioned such that displacement of said movable member in one direction tends to close said first angular orifice at the apex of the angle,
(3) a second angularly shaped orifice interconnecting the center chamber with the pump, said second orifice being variably blocked by the other piston of said movable valve member and positioned such that displacement of said movable member in the one direction tends to open said second orifice at the apex of the angle, and
(4) a biasing member in one end chamber, said biasing member biasing said movable member in the one direction; and (d) a hydraulic rectifier connected to said control valve and interconnecting the side of the motor at the higher pressure with the first chamber of said relief valve such that displacement of said movable member in the one direction depends on the force of said biasing member plus the pressure at the one side of the motor minus the pressure at the pump.

12. A load compensating hydraulic system having a reservoir containing fluid and a reversible motor, the improvement comprising:

(a) a variable delivery pump having,
(1) a swash plate the angle of which determines the output of the pump,
(2) a first piston and cylinder arrangement, the piston of which contacts the swash plate tending to increase the angle thereof, and
(3) a second piston and cylinder arrangement parallel with said first arrangement, the piston of said second arrangement contacting the swash plate tending to decrease the angle thereof, said second piston having an end area a fraction of the end area of said first piston;

(b) a control valve selectively interconnecting one side of the motor to the pump and the other side of the motor to the reservoir;

(c) a relief valve having,
(1) a movable valve member having two spaced interconnected pistons which divide said relief valve into a first end chamber, a center chamber, and a second end chamber, said center chamber being connected to said first piston and cylinder arrangement such that the end area of said first piston is exposed to the pressure in said center chamber, said first end chamber being connected to the reservoir,
(2) a first angularly shaped orifice interconnecting the center chamber with the reservoir, said first orifice being variably blocked by one end piston and positioned such that displacement of said movable member in one direction tends to close said first angular orifice at the apex of the angle,
(3) a second angularly shaped orifice interconnecting the center chamber with the pump, said second chamber being variably blocked by the other end piston and positioned such that displacement of said movable member in the one direction tends to open said second angular orifice at the apex of the angle, and
(4) a biasing member in one end chamber, said biasing member biasing said movable member in the one direction; and (d) a hydraulic rectifier connected to said control valve and interconnecting the other side of the motor with the second end chamber of said relief valve such that the displacement of said movable member depends on the force on said biasing member minus the pressure at the other side of the motor.

13. In a load compensating hydraulic system having a reservoir containing fluid and a reversible motor, the improvement comprising:

(a) a variable delivery pump having,
(1) a swash plate the angle of which determines the output of said pump,
(2) a first piston and cylinder arrangement the piston of which contacts said swash plate tending to increase the angle thereof, and
(3) a second piston and cylinder arrangement parallel with said first arrangement and on the diametrically opposite side of said swash plate from said first arrangement, the piston of said second arrangement contacting said swash plate tending to decrease the angle thereof;

(b) a control valve selectively interconnecting one side of the motor with the pump and the other side of the motor with the reservoir;

(c) a relief valve having,
(1) a movable valve member having three spaced interconnected pistons, one of the end pistons having an enlarged sleeve piston thereon and coaxial therewith, said movable member dividing said relief valve into a first and second end chamber, a first and second enlarged end chamber, and a first and second central chamber, said first end chamber being connected to the reservoir, said first central chamber being connected to the first piston and cylinder arrangement of said pump, said second central chamber being connected to the second piston and cylinder arrangement of said pump, and said second end chamber being connected to the output of said pump, (2) a first orifice interconnecting the first central chamber with the reservoir, said first orifice being variably blocked by one end piston such that the displacement of said movable member in one direction tends to close said first orifice, (3) a second orifice interconnecting the second central chamber with the reservoir, said second orifice being variably blocked by the other end piston such that displacement of said movable member in the one direction tends to open said second orifice, (4) a third orifice interconnecting the pump with the central chambers of said relief valve, said third orifice being variably blocked by the center piston of said movable member such that displacement of said movable member in the one direction tends to close said third orifice to the second central chamber and tends to open said third orifice to the first central chamber, and (5) a biasing member in one end chamber which biases said movable member in the one direction; and (d) a hydraulic rectifier interconnecting the first enlarged end chamber with the one side of the motor and the second enlarged end chamber with the other side of the motor such that the displacement of said movable member in the one direction depends on the force of the biasing member plus the pressure at the one side of the motor minus the pressure at the other side of the motor and the pressure at the output of the pump.

14. A system as claimed in claim 13 wherein said orifices are angularly shaped and positioned such that the apex of the angle of said orifices is the first to be opened and the last to be blocked by displacement of said movable member.

15. In a load compensating hydraulic system having a reservoir containing fluid and a reversible motor, the improvement comprising:

(a) a variable delivery pump having,
(1) a swash plate the angle of which determines the output of said pump,
(2) a first piston and cylinder arrangement the piston of which contacts said swash plate tending to increase the angle thereof, and
(3) a second piston and cylinder arrangement parallel with said first arrangement and on the diametrically opposite side of said swash plate from said first arrangement, the piston of said second arrangement contacting said swash plate tending to decrease the angle thereof, said second piston having an end area a fraction of the end area of said first piston;

(b) a control valve selectively interconnecting one side of the motor with the pump and the other side of the motor with the reservoir;

(c) a relief valve having,
(1) a movable valve member having two spaced interconnected pistons, one of said pistons having an enlarged sleeve piston thereon and coaxial therewith, said movable member dividing said relief valve into a first end chamber, a center chamber, a second end chamber, a first enlarged end chamber, and a second enlarged end chamber, said first end chamber being connected to the reservoir, said center chamber being connected to the first piston and cylinder arrangement of said pump, and said second end chamber being connected to the output of said pump, (2) a first orifice interconnecting the center chamber with the reservoir, said first orifice being variably blocked by one piston such that the displacement of said movable member in one direction tends to close said first orifice, (3) a second orifice interconnecting the output of the pump with said central chamber, said second orifice being variably blocked by the other piston such that displacement of said movable member in the one direction tends to open said second orifice, and (4) a biasing member in one end chamber which biases said movable member in the one direction; and (d) a hydraulic rectifier interconnecting the first enlarged end chamber with the one side of the motor and the second enlarged end chamber with the other side of the motor such that the displacement of said movable member in the one direction depends on the force of the biasing member plus the pressure at the one side of the motor minus the pressure at the other side of the motor and the pressure at the output of the pump.

16. A system as claimed in claim 15 wherein said orifices are angularly shaped and positioned such that the apex of the angle of said orifices is the first to be opened and the last to be closed by displacement of said movable member.

References Cited
UNITED STATES PATENTS

| | | |
|---|---|---|
| 3,015,212 | 1/1962 | Krafft et al. |
| 3,247,669 | 4/1966 | Hann. |
| 3,359,727 | 12/1967 | Hann et al. |

EDGAR W. GEOGHEGAN, Primary Examiner

U.S. Cl. X.R.

60—53